United States Patent

[11] 3,600,547

| | | |
|---|---|---|
| [72] | Inventor | Philip L. Turner<br>Southfield, Mich. |
| [21] | Appl. No. | 67,443 |
| [22] | Filed | Aug. 27, 1970 |
| [45] | Patented | Aug. 17, 1971 |
| [73] | Assignee | Ford Motor Company<br>Dearborn, Mich. |

[54] AUTOMATIC MAGAZINE-TYPE ELECTRODE HOLDER FOR AN ELECTROSTATIC DISCHARGE MACHINING DEVICE
12 Claims, 9 Drawing Figs.

[52] U.S. Cl. .................................................... 219/69 E,
204/143 M, 314/5
[51] Int. Cl. .................................................... B23p 1/04,
B23p 1/08, H05b 31/20
[50] Field of Search ........................................ 219/69 E,
69 G; 314/5; 204/143 M

[56] References Cited
UNITED STATES PATENTS
| 606,108 | 6/1898 | Wright | 314/5 |
| 1,062,907 | 5/1913 | Guay | 314/5 |
| 3,125,700 | 3/1964 | Bentley et al. | 219/69 G X |
| 3,484,646 | 12/1969 | Purcell | 314/5 |

*Primary Examiner*—R. F. Staubly
*Attorneys*—John R. Faulkner and Donald J. Harrington

ABSTRACT: An electrostatic discharge machining device comprising an automatic feeder for loading electrodes automatically and for successively advancing them to compensate for erosion including an electrode holder for positioning the electrodes, a quill support adapted to receive the electrodes prior to a machining operation and an actuator for advancing the quill support toward the electric spark region during machining operations thereby maintaining a proper arc gap and an automatic cam mechanism for triggering the operation of the actuator in timed sequence with the advancing and retracting modes for the electrode quill support, the actuator and said cam mechanism being adapted to eject successively each electrode after it is eroded to a predetermined extent and for replacing it with a new electrode during subsequent advancement of the electrode quill support to its operating position.

Fig. 9

AUTOMATIC MAGAZINE-TYPE ELECTRODE HOLDER FOR AN ELECTROSTATIC DISCHARGE MACHINING DEVICE

GENERAL DESCRIPTION OF THE INVENTION

My invention relates generally to the art of electrical discharge machining, sometimes referred to as EDM. It includes improvements that are adapted especially for use with an EDM device for machining precision apertures in automotive carburetor parts.

Such apertures are located in some instances in places that are inaccessible to conventional tooling. A fuel passage may be machined with EDM, for example, in the inner throat region of an air-fuel mixture carburetor for an internal combustion engine. This involves the use of an electrode carried by an electrode quill shaft which may be advanced and retracted within the throat of the carburetor after the carburetor is assembled by means of suitable fixtures in a predetermined machining position.

After the quill shaft is advanced into the carburetor throat, the electrode is fed toward the spark region during the machining operation by means of an automatic, closed loop, servofeed mechanism. When a predetermined electrode gap is achieved, an automatic control system triggers the arc, which results in displacement of metal.

The positioning of the electrode determines the shape of the hole or cavity being machined. This is accompanied by erosion of the electrode. Thus, an automatic logic circuit for controlling the advancement and retraction of the electrode with respect to the workpiece is called upon to adjust the electrode during the machining operation and to change electrode as the quill shaft is retracted.

A position sensing device forms a part of the logic circuit which advances the electrode and retracts it until the electrode is eroded to a degree which requires its rejection. My improved feeding mechanism accomplishes the rejective process as part of its operating cycle.

Several electrodes are made available to the EDM apparatus during the machining operation. Each electrode, after it is adjusted into position, is advanced through predetermined increments in response to machine logic commands. The mechanism that accomplishes this automatic incremental feeding includes an indexing cam and a cam follower, the latter being engageable with the electrode as it is advanced and retracted by a cylinder and piston mechanism. The degree of advancement is determined by the cam position. Each advancement and retraction is accompanied by an indexing motion of the cam mechanism so that a subsequent advancement of the electrode actuator will be accompanied by further linear travel of the electrode until a limiting position is achieved. The indexing motion of the cam that follows that final advancement of the electrode actuator automatically causes a new electrode to move into the path of motion of the electrode actuator so that a subsequent advancement of the actuator with the new electrode will result in a repetition of the earlier operating cycle.

PARTICULAR DESCRIPTION OF THE INVENTION

Figure 2:
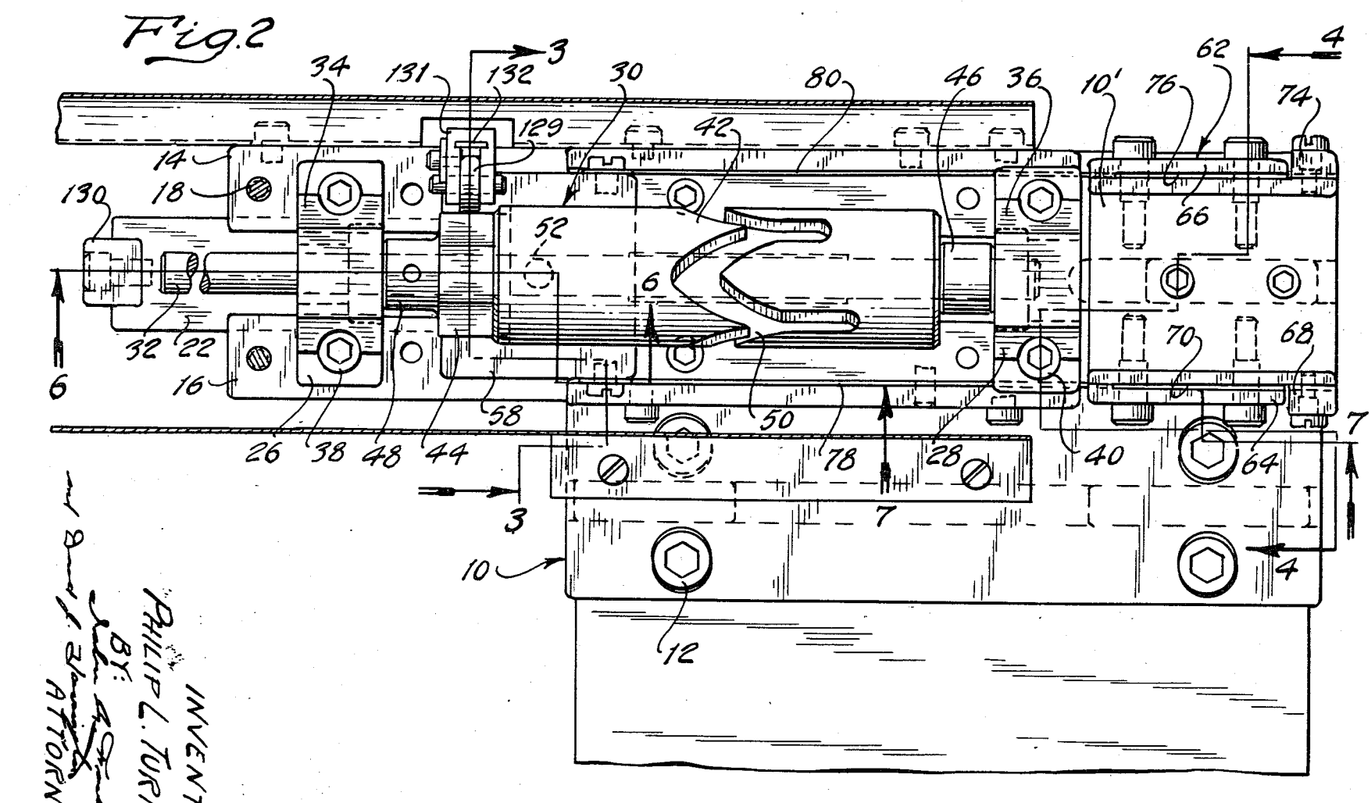
FIG. 2 is a plan view of the structure of FIG. 1.

Numeral 10 designates in the drawings the base of the feeder mechanism. The base includes an extension as seen in FIG. 2 through which clamping bolts 12 are received. These secure the base to relatively stationary structure of the EDM apparatus. Two slide guideways 14 and 16 are secured by bolts 18 to the upper side of the base 10. They define an elongated space 20 within which is positioned a slide 22.

A platform 24 extends over each of the guideways 14 and 16. Spaced bearing supports 26 and 28 provide a support for a cam generally indicated by reference character 30. Cam 30 includes a shaft 32 which is received within bearing 34 supported in a bearing opening formed in the support 26. Similarly, the other end of shaft 32 is received within bearing 36 which in turn is located in a bearing opening formed in bearing support 28. Clamping bolts 38 and 40 retain the bearing supports 26 and 28 respectively on the upper surface of the platform 24.

Cam mechanism 30 includes a cylindrical member 42 having a cylindrical pin through which the shaft 32 extends. The left hand end of the cylindrical member 42 forms an octagon, as shown at 44. Clamping nuts 46 and 48 secure the member 42 in place on the shaft 32.

Figure 9:
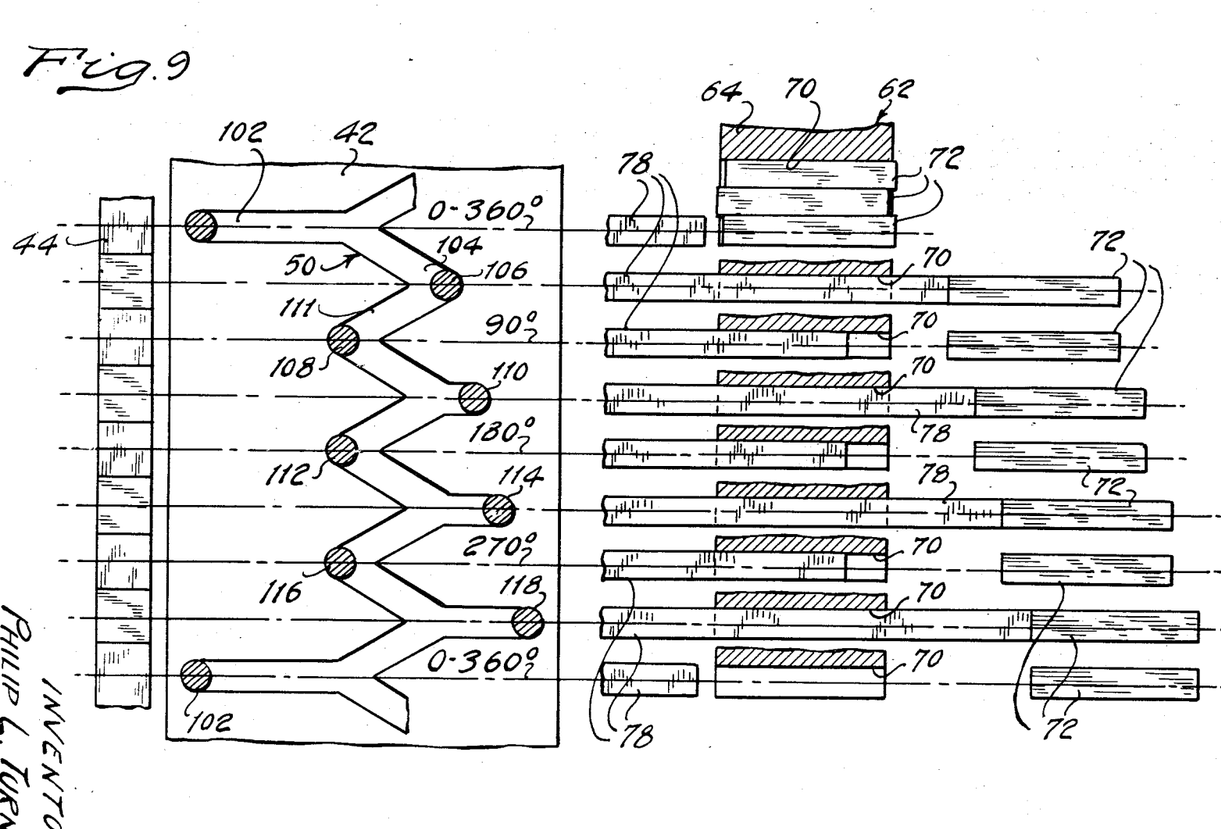
FIG. 9 is a schematic diagram showing the cam profile for the adjustable cam member of FIG. 1.

The cam member 42 is provided with cam grooves 50, which are formed in the pattern illustrated in FIG. 9. FIG. 9 is an unwrapped plan view of the cam surface of the member 42.

Figure 6:
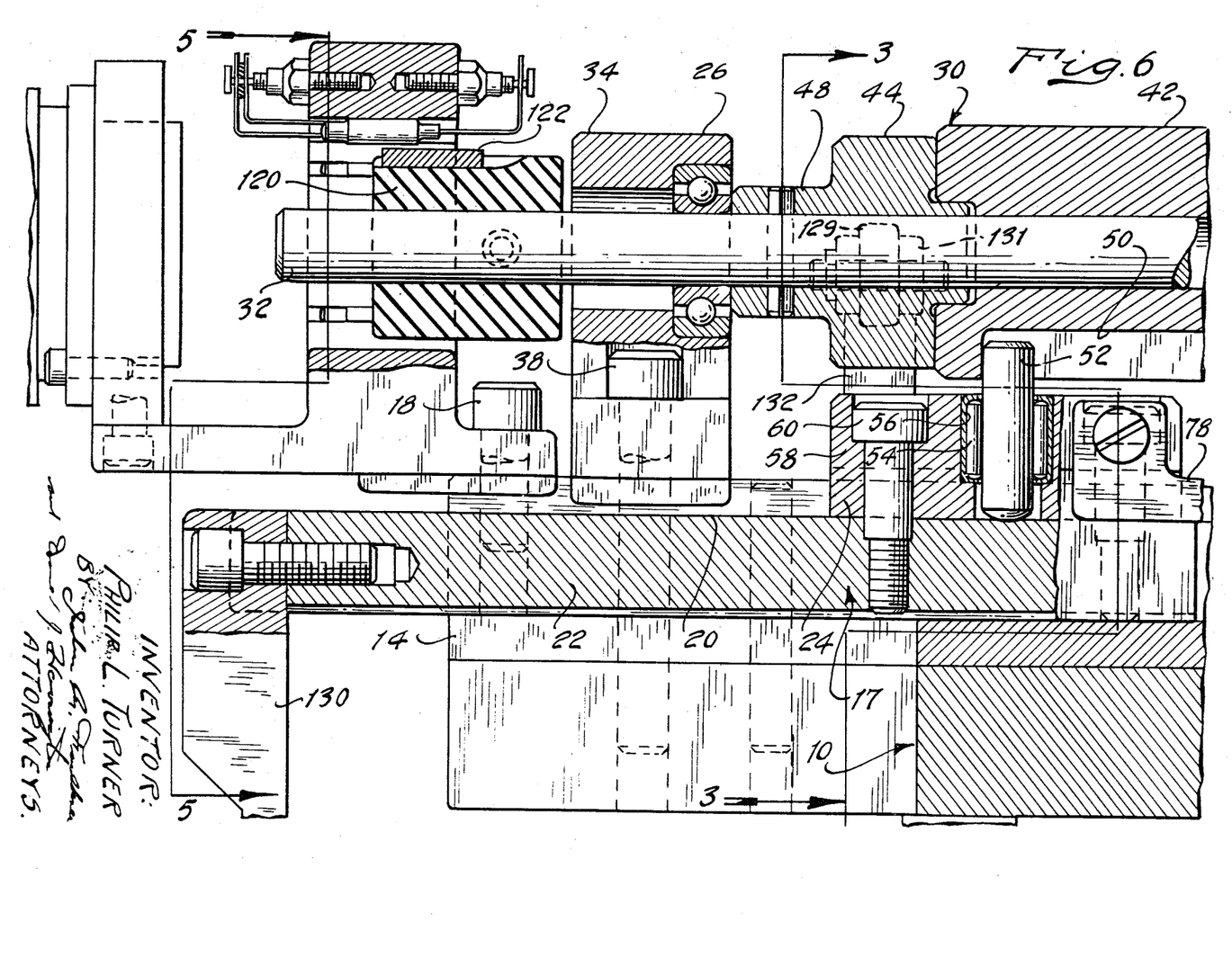
FIG. 6 is a cross-sectional view taken along the plane of section line 6–6 of FIG. 2.

A cam follower in the from of a pin 52 is received in the cam groove 50. Pin 52, as best seen in FIG. 6, is journaled for rotation about a vertical axis by means of a needle bearing 54. This in turn is received within a bearing opening 56 formed in bearing support 58 which is bolted by means of bolts 60 to the upper surface of platform 17.

A hopper generally indicated by reference character 62 in FIG. 2, includes plates 64 and 66 secured to the lateral sides of a support 10, which is bolted to the top of base 10. A plate 68 is secured to one side of plate 64 and is spaced therefrom with suitable spacers to provide a gap 70 which receives in stacked relationship a series of electrode elements 72. Similarly, plate 74 is secured against plate 66. It is spaced therefrom by suitable spacers to provide a gap 76 in which is situated a second stacked series of electrode elements 72.

A first actuator rod 78 is secured to one side of the support 58 and a second actuator rod 80 is secured to the opposite side of the support 58. These actuator rods extend longitudinally and are arranged in registry with the gaps 70 and 76.

Figure 1:
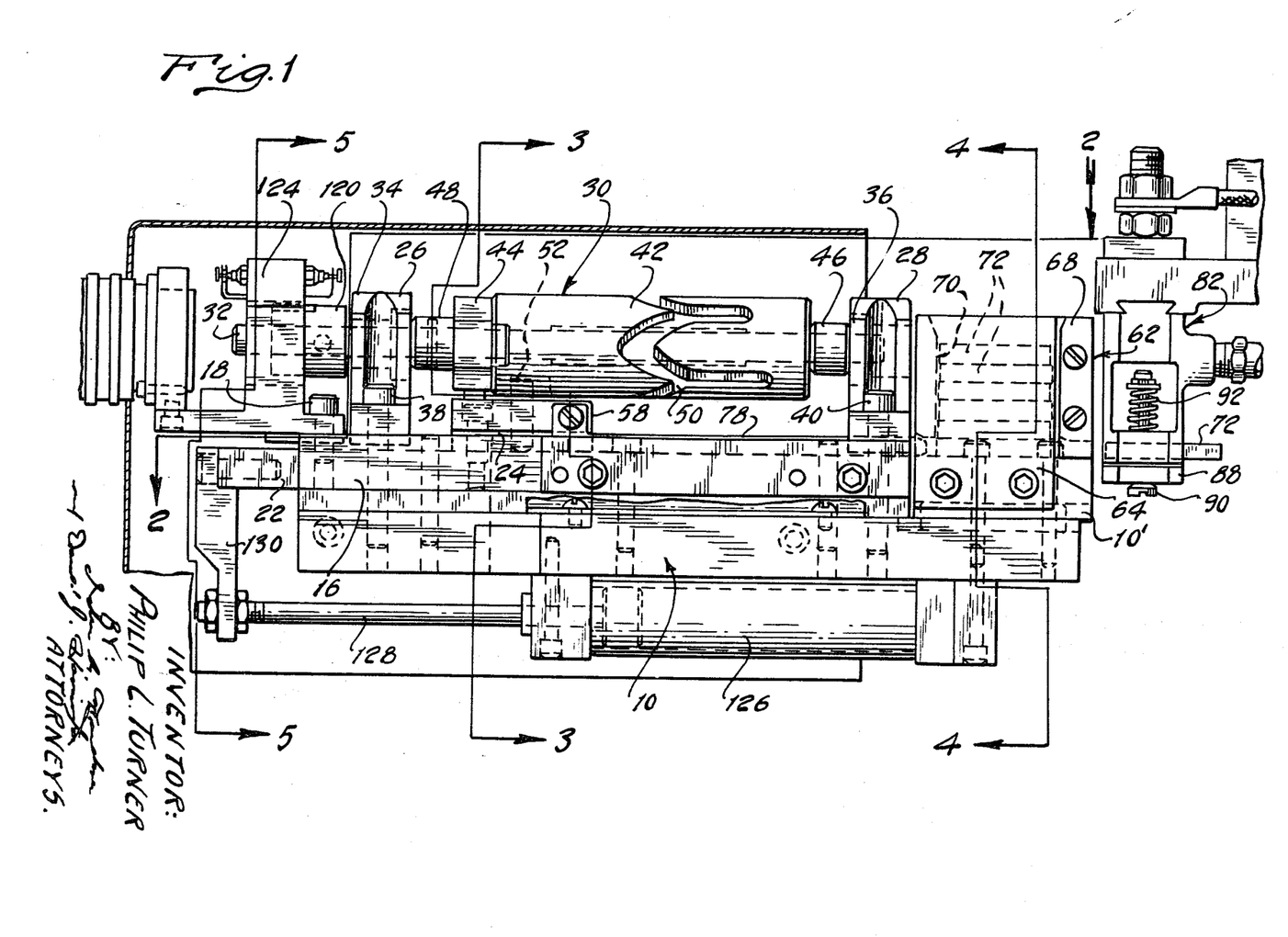
FIG. 1 shows a side elevation view of my improved automatic feeder with parts in cross section.

A quill shaft 82 is situated adjacent hopper 62. It is adapted to move from one vertical position to another as indicated in FIG. 1. When quill 82 is lowered, it is in the cutting position. When it is retracted, it is in a position such that it may receive one of the electrodes 72 from the feeder mechanism.

Figures 7, 8:
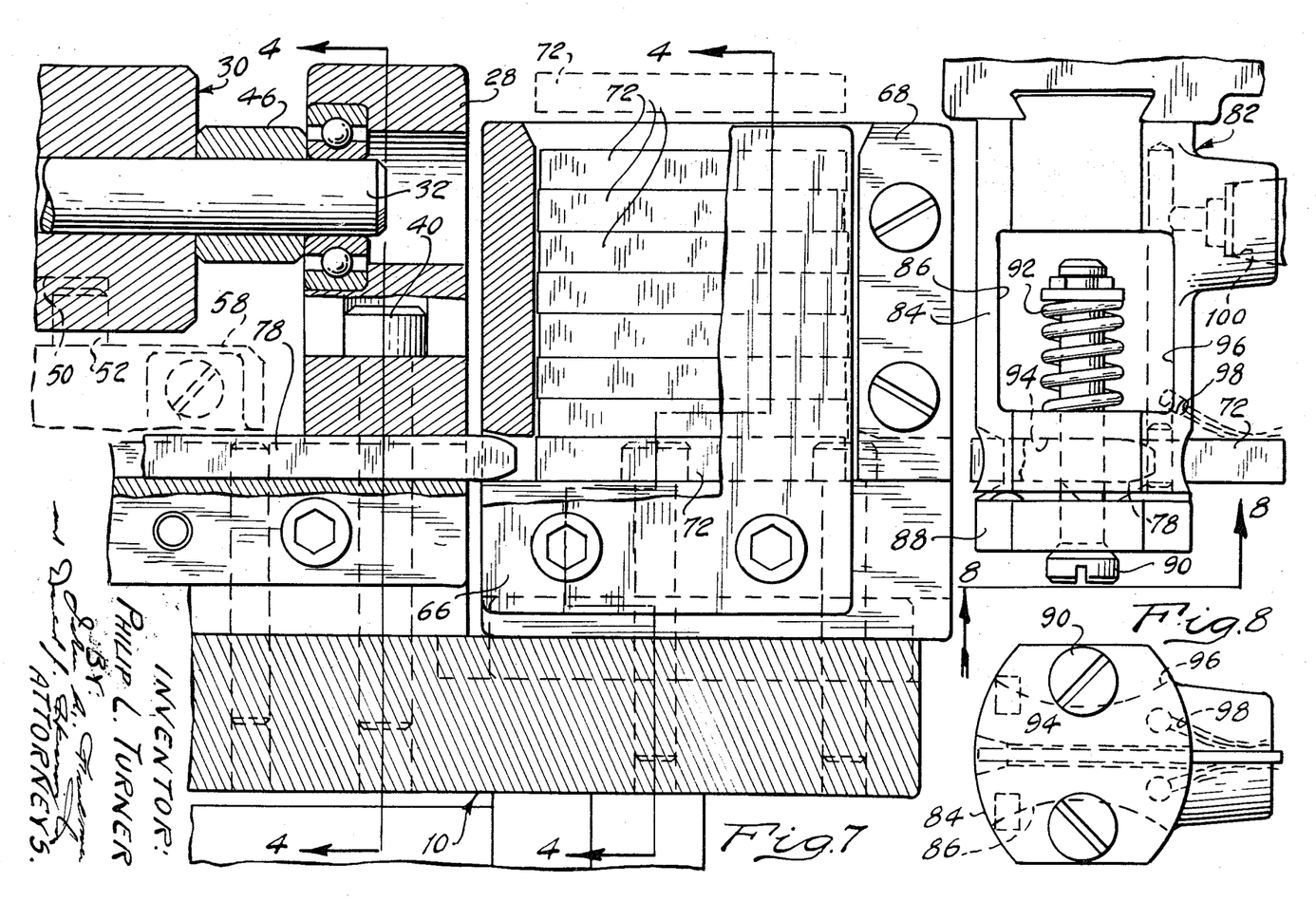
FIG. 7 is a cross-sectional view taken along the plane of section line 7–7 of FIG. 1.
FIG. 8 is an end view as seen from the plane of section line 8–8 of FIG. 7.

The operating end of quill 82 is illustrated in cross-sectional form in FIG. 7. It includes a shaft 84 having a central opening 86. A clamping disc 88 is retained on the end of shaft 84 by a stem 90 received through a central opening in clamping disc 88. Stem 90 extends into opening 86 and is urged by a spring 92 toward a clamping position. Electrode 72 is fed into a slot 94 in a transverse direction with respect to the axis of the shaft end 84. It is held in place by a disc 88.

A dielectric fluid passage 96 is formed in shaft 84. It includes a nozzle 98 which ejects dialectric fluid toward the tip of electrode 72. It is fed with fluid from a fluid conduit received within fitting opening 100.

In the unwrapped view of cam element 42, which is seen in FIG. 9, the path of motion of pin 52 may be observed. The cam profile 50 includes a first axially directed groove portion at position 102. This communicates with a first diagonally positioned groove portion 104, which terminates in a first end position 106. In the schematic diagram of FIG. 9, pin 52 is shown in its various operating positions, one of which includes position 106.

When pin 52 moves from the position shown in FIG. 1 to position 106, cam member 42 is indexed because position 106 is angularly disposed with respect to the initial cam position illustrated in FIG. 1.

When the cam is retracted from position 106 to position 108, it follows cam groove portion 111. In doing so the cam member 42 again is indexed because of the angular disposition of position 106 with respect to position 108. Upon the subsequent advance of the pin 52, the next operating position 110 is reached. This position is displaced longitudinally with respect to the original operating position 106. In one preferred embodiment, the position 106 is displaced about one-quarter inch from position 110. This action is repeated as the pin 52 retracts to position 112, to operating position 114, to position 116, to operating position 118 and finally to the initial position 102.

Figure 5:
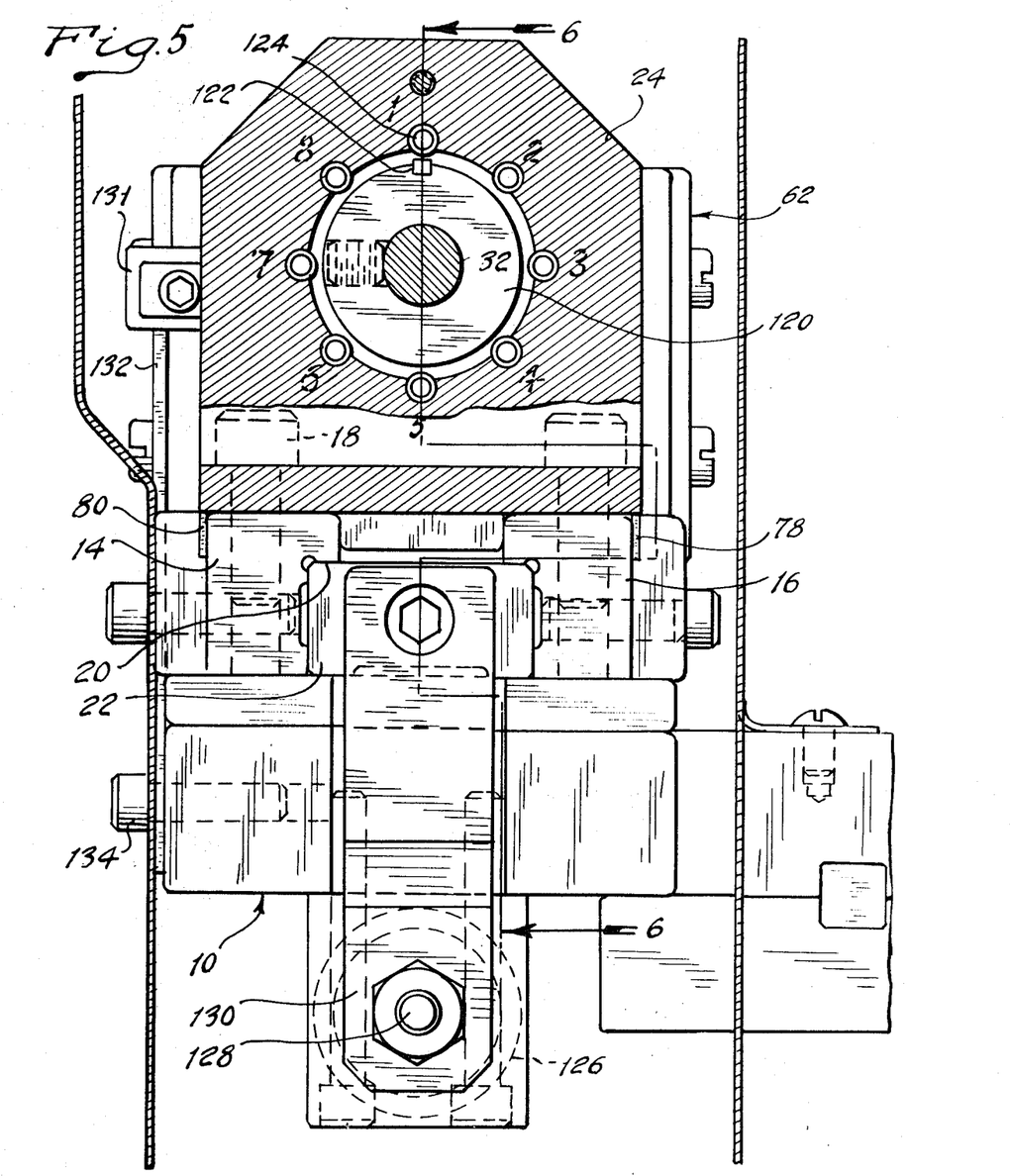
FIG. 5 is an end view of the structure of FIG. 1.

Part of the logic circuit for the EDM apparatus includes a rotary switch comprising an armature 120 carried by the left-hand end of the shaft 32. The armature includes a permanent magnet 122 which is adapted to actuate eight proximity switches 124. The switches 124 are closed whenever the magnet 122 assumes the predetermined position indicated by the reference numbers 1 through 8 in the end view of FIG. 5. The logic circuit then is able to sense the angular position of the cam member 42.

During operation of the mechanism, the pin 52 assumes the position shown in FIG. 1 at the outset. The quill 82, as it is retracted, presents the gaps 76 and 70 so that they are in alignment with the actuator rods 78 and 80. Retraction of the quill triggers the operation of a motor, which comprises a cylinder 126 and a piston rod 128. The end of the rod 128 is connected by means of member 130 to the slide 16. Slide 16 then is moved in right hand direction causing the electrodes 72 to be pushed into the slots 94 in the end 84 of quill shaft. As the electrodes are advanced in this fashion the pin 52 moves to the retracted position, as shown in FIG. 9, to position 106. The quill then moves downwardly to the lower position indicated in FIG. 1 where it is energized with a controlled voltage to effect the electrostatic discharge machining operation.

The quill may be advanced during electrostatic machining to compensate for the change in gap that occurs due to electrode erosion. After a predetermined erosion occurs, a proximity switch in the logic circuit for the apparatus will trigger the motor shown in part at 126 and 128, thereby retracting the slide and causing the pin to move from position 106 to position 108. This indexes cam element 42 so that the actuator shafts 78 and 80, following a retraction of the quill 82, again may engage and advance the electrodes 72 approximately one-quarter inch.

A second operating position for the pin, following advancement of the appropriate electrode 72, is shown at 110. As the quill 82 then is returned to the operating position, the electrostatic machine operation may continue. Subsequent adjustments of the electrode 72 occur as the actuator rods advance the electrodes to position 114 and to position 118. A subsequent retraction of the quill will result in an indexing motion to the original position 102. At that time a new electrode 72 will drop into place in the hopper at 62. As the actuator rods 78 and 80 again are advanced during a subsequent operating cycle, the old electrodes 72 are pushed out of the quill 82 as the fresh electrode 72 takes its place.

In order to assure that the pin 52 will move from position 102 to position 106 and then to position 108, it is necessary to establish a slight torque on the cam element 42 when the pin is in the position 106. This torque will tend to cause the pin 52 to follow track or guideway 110 rather than return along track 104 to the original position. It is applied by roller 129 journaled on member 131, which in turn is supported on the end of cantilever spring 132. The end of spring 132 is secured by clamping bolts 134 to the base 10.

Figure 3:
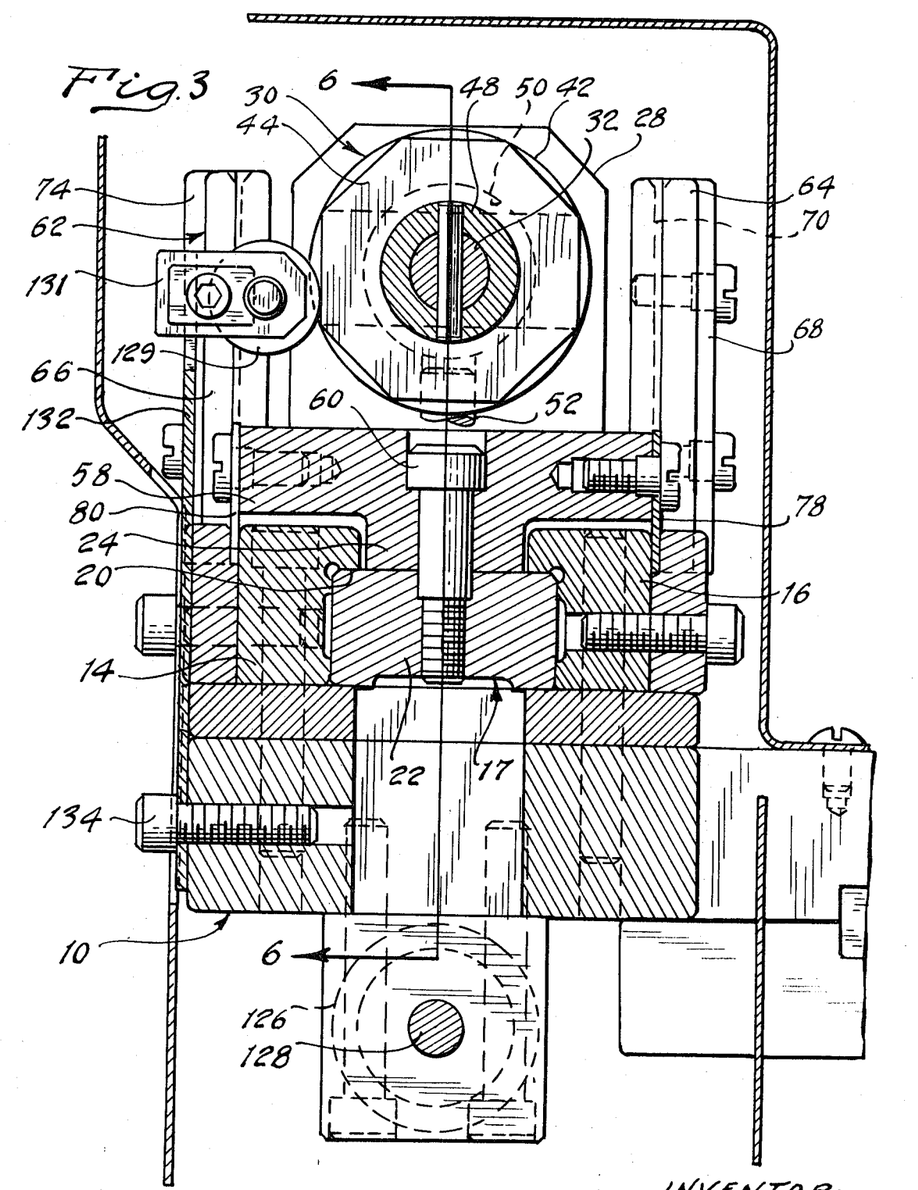
FIG. 3 is a cross-sectional view taken along the plane of section line 3–3 of FIG. 1.
Figure 4:
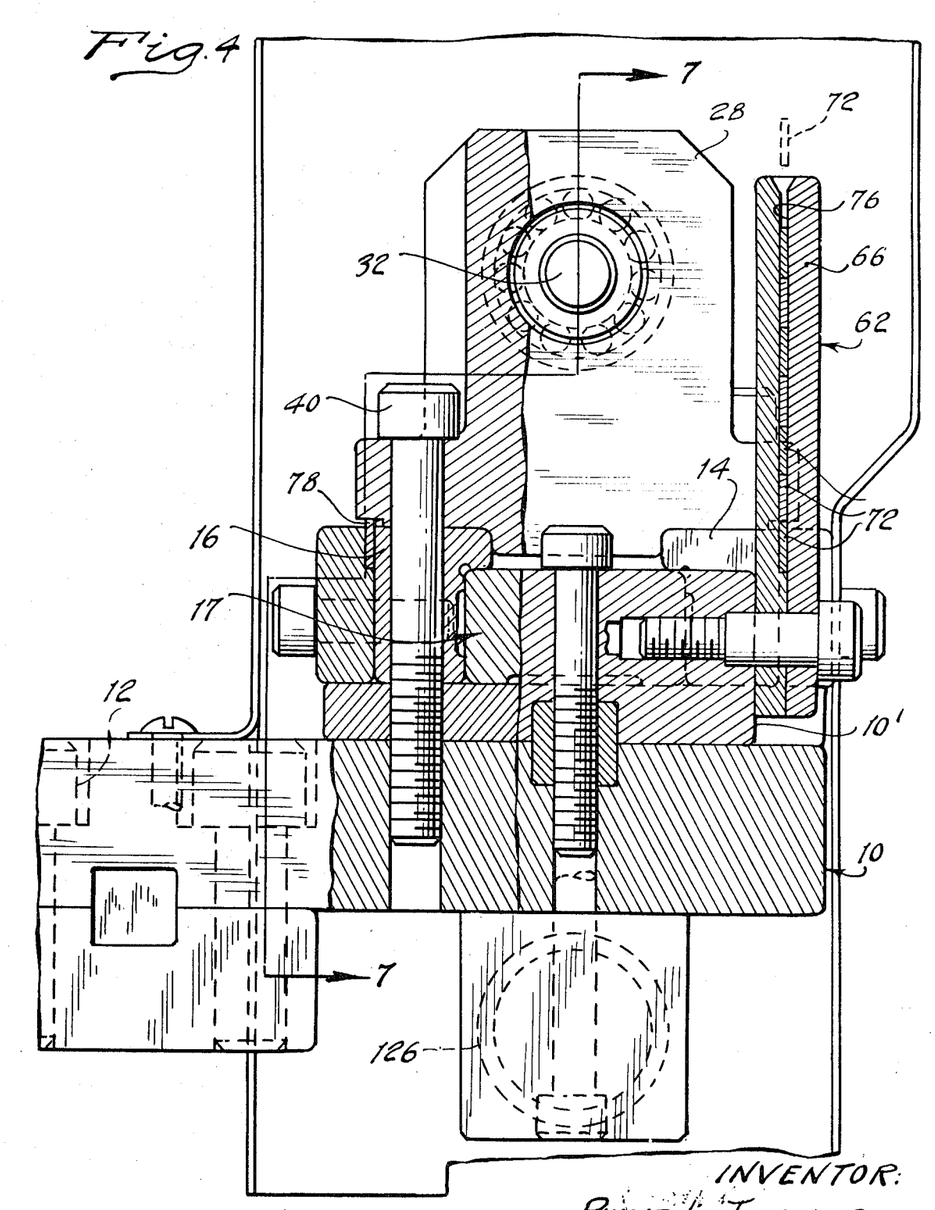
FIG. 4 is a cross-sectional view taken along the plane of section line 4–4 of FIG. 1.

As seen in FIG. 3, roller 129 engages the sides of octagonal member 44. The angular disposition of the octagonal member 44 with respect to the roller 129 is such that the roller 129 will impart a forward bias on the member 42 when the pin 52 is in position 106. The same is true when the pin 52 is in positions 110, 114 and 118. A progression of the pin 52 then will occur as indexing motion of element 42 results in a complete revolution about its axis.

Having thus described a preferred form of my invention, what I claim and desire to secure by U.S. Letters Patent is:

1. An automatic feeder for successively advancing an electrode into an electrode holder of an electrostatic discharge machine comprising a support, means for storing a supply of electrodes in a stationary position with respect to said support, a slide carried by said support, guideways for controlling movement of said slide relative to said support in a longitudinal direction parallel to the direction of disposition of said electrodes, an actuator shaft carried by said slide and extending in the direction of motion of said slide, said actuator shaft being aligned in registry with said electrodes and adapted to engage selectively each electrode as said slide is advanced in said longitudinal direction, a rotary cam member carried by said support and adapted for rotation about an axis parallel to the direction of motion of said slide, and a cam follower carried by said slide, cam grooves in said cam member registering with said cam follower, said cam grooves having a plurality of angularly spaced terminal positions corresponding to the operating positions of said cam follower, each terminal position being axially displaced with respect to an adjacent terminal position, the terminal positions being connected together by said cam grooves whereby said cam member is indexed angularly about its axis as said slide is advanced and retracted.

2. The combination set forth in claim 1 wherein said slide includes means for biasing said cam member in the direction of its indexing motion thereby assuring the indexing of said cam follower to each of the terminal positions defined by said cam grooves.

3. The combination set forth in claim 2 wherein said biasing means comprising an indexing member carried by said cam member and having flat surfaces evenly spaced about the axis of said cam member, a cam roller engaging said flat surfaces, and means for spring biasing said cam roller into registry with the flat surfaces thereby inducing a turning torque on said cam member that causes said cam member to index to successive operating positions as said slide advances and retracts during operation.

4. The combination set forth in claim 2 wherein said electrode holder includes a quill adapted to reciprocate in a direction transverse to the direction of motion of said slide, a retainer on said quill having an entrance portion adapted to register in alignment with selected electrodes when said quill is retracted to an inoperative position, said quill being adapted to be advanced transversely with respect to the axis of said cam member to an operating position as said slide is retracted, said slide including a fluid pressure-operated motor means having one part connected to said support and another part connected to movable parts of said slide for advancing and retracting said slide.

5. The combination set forth in claim 1 wherein said electrode holder includes a quill adapted to reciprocate in a direction transverse to the direction of motion of said slide, and a retainer on said quill having an entrance portion adapted to register in alignment with selected electrodes when said quill is retracted to an inoperative position, said quill being adapted to be advanced transversely with respect to the axis of said cam member to an operating position as said slide is retracted, said slide including a fluid pressure-operated motor means having one part connected to said support and another part connected to movable parts of said slide for advancing and retracting said slide.

6. An automatic feeder for successively advancing an electrode into an electrode holder of an electrostatic discharge machine comprising a support, means for storing electrodes in a stationary position with respect to said support, a slide member carried by said support, guideways for controlling movement of said slide relative to said support in a longitudinal direction parallel to the direction of disposition of said electrodes, an actuator shaft carried by said slide and extending in the direction of motion of said slide, said actuator shaft being aligned in registry with said electrodes and adapted to engage selectively each electrode as said slide is advanced in said longitudinal direction, a rotary cam member carried by said support and adapted for rotation about an axis parallel to the direction of motion of said slide, a cam follower carried by said slide, and cam grooves in said cam member registering with said cam follower, said cam grooves having a plurality of angularly spaced terminal positions corresponding to the operating positions of said cam follower, each terminal position being axially displaced with respect to an adjacent terminal position, the terminal positions being connected together by said cam grooves whereby said cam member is indexed angularly about its axis as said slide is advanced and retracted, the end of said actuator shaft engaging the end of an electrode whereby said slide causes said electrodes to be advanced in steps in said electrode holder thereby compensating for electrode erosion during electrostatic discharge machining.

7. The combination set forth in claim 6 wherein said slide includes means for biasing said cam member in the direction of its indexing motion thereby assuring the indexing of said cam follower to each of the terminal positions defined by said cam grooves.

8. The combination set forth in claim 7 wherein said biasing means comprising an indexing member carried by said cam member and having flat surfaces evenly spaced about the axis of said cam member, and a cam roller engaging said flat surfaces, and means for a spring biasing said cam roller into registry with the flat surfaces thereby inducing a turning torque on said cam member that causes said cam member to index to successive operating positions as said slide advances and retracts during operation.

9. The combination set forth in claim 8 wherein said electrode holder includes a quill adapted to reciprocate in a direction transverse to the direction of motion of said slide, and a retainer on said quill having an entrance portion adapted to register in alignment with selected electrodes when said quill is retracted to an inoperative position, said quill being adapted to be advanced transversely with respect to the axis of said cam member to an operating position as said slide is retracted, said slide including a fluid pressure-operated motor means having one part connected to said support and another part connected to movable parts of said slide for advancing and retracting said slide.

10. The combination set forth in claim 7 wherein said electrode holder includes a quill adapted to reciprocate in a direction transverse to the direction of motion of said slide, and a retainer on said quill having an entrance portion adapted to register in alignment with selected electrodes when said quill is retracted to an inoperative position, said quill being adapted to be advanced transversely with respect to the axis of said cam member to an operating position as said slide is retracted, said slide including a fluid pressure-operated motor means having one part connected to said support and another part connected to movable parts of said slide for advancing and retracting said slide.

11. The combination set forth in claim 7 wherein said electrode holder includes a quill adapted to reciprocate in a direction transverse to the direction of motion of said slide, and a retainer on said quill having an entrance portion adapted to register in alignment with selected electrodes when said quill is retracted to an inoperative position, said quill being adapted to be advanced transversely with respect to the axis of said cam member to an operating position as said slide is retracted, said slide including a fluid pressure-operated motor means having one part connected to said support and another part connected to movable parts of said slide for advancing and retracting said slide.

12. The combination set forth in claim 6 wherein said electrode holder includes a quill adapted to reciprocate in a direction transverse to the direction of motion of said slide, and a retainer on said quill having an entrance portion adapted to register in alignment with selected electrodes when said quill is retracted to an inoperative position, said quill being adapted to be advanced transversely with respect to the axis of said cam member to an operating position as said slide is retracted, said slide including a fluid pressure-operated motor means having one part connected to said support and another part connected to movable parts of said slide for advancing and retracting said slide.